R. W. BAILY.
PLATE BENDING PRESS.
APPLICATION FILED JAN. 14, 1920.

1,437,953.

Patented Dec. 5, 1922.
7 SHEETS—SHEET 1.

R. W. BAILY.
PLATE BENDING PRESS.
APPLICATION FILED JAN. 14, 1920.

1,437,953.

Patented Dec. 5, 1922.

Patented Dec. 5, 1922.

1,437,953

UNITED STATES PATENT OFFICE.

ROBERT W. BAILY, OF CHICAGO, ILLINOIS.

PLATE-BENDING PRESS.

Application filed January 14, 1920. Serial No. 351,503.

*To all whom it may concern:*

Be it known that I, ROBERT W. BAILY, a citizen of the United States, residing at Chicago, in the county of Cook and State of Illinois, have invented certain new and useful Improvements in Plate-Bending Presses, of which the following is a specification.

This invention relates to a bending press and more particularly to a press for bending warping and flanging large metal plates without the use of rolls.

In connection with the fabrication of ships there are used a large number of plates, such as bilge plates and the like; varying in thickness, a large portion of which would be approximately from one-half to one inch in thickness, and of widths up to eight feet or more, and twenty-four to thirty feet or more in length. These large plates must be formed to have a curvature with a radius up to four feet or more, and the axis of the curved portion parallel to the long dimension of the plate. It has been customary heretofore to form these plates by rolling them between large bending rolls usually thirty inches or more in diameter and about thirty-two feet in length not including the overhanging spindle at one end. There are many drawbacks connected with forming these plates by rolling and bending between these large rolls, among the more principal ones of which may be mentioned (1) the difficulty of obtaining these rolls as a result of the present great demand for the material required in their manufacture, (2) the great cost even when possible to obtain them at all, and (3) the long wait necessary before they can be finished and delivered, such delay often amounting to seven months or more.

All of these objections and obstacles, and many others not mentioned, which accompany the forming of such large plates between these large rolls, are completely obviated and overcome by my present invention, in which I form these plates by bending in such a manner as to entirely eliminate the necessity of the use of rolls.

Among the objects of my invention therefore is to render possible and practicable the bending of large plates into desired curvatures without the use of rolls; further to provide dies arranged to approach each other with sufficient force to effect the bending of large plates; further to arrange a plurality of such pairs of dies side by side whereby to accommodate the bending of plates of any desired length; further to make the respective dies adjustable, or removable, whereby in the latter case they may be replaced with dies of varying curvatures; further to provide means whereby the moving ones of said dies may be operated singly, in groups or all simultaneously; further to provide a plurality of rows of said dies arranged sufficiently close together to provide for the bending therein of warped surfaces; further to provide means whereby some of said dies may be adjusted towards or away from the others to render possible the forming of an indefinite number of warped surface curvatures; further to provide means whereby after a plate has been bent into a substantially closed cylinder it may be slid endwise from the machine to facilitate its removal therefrom; further to effect the bending of plates of considerable width by forming in them a plurality of bends at such distances apart that they will merge into a curvature of general uniformity; further to effect the bending of plates in such manner as to produce either a curved or angular bend; further to provide a powerful yet simple, efficacious, and economical device of the class described; and such further objects, advantages, and capabilities as will later more fully appear.

My invention further resides in the combination, construction and arrangement of parts illustrated in the accompanying drawings, and while I have shown therein a preferred construction of my invention, I desire it to be understood that the same is susceptible of modification and change without departing from the spirit of my invention.

Referring to the drawings.

Figure 1:
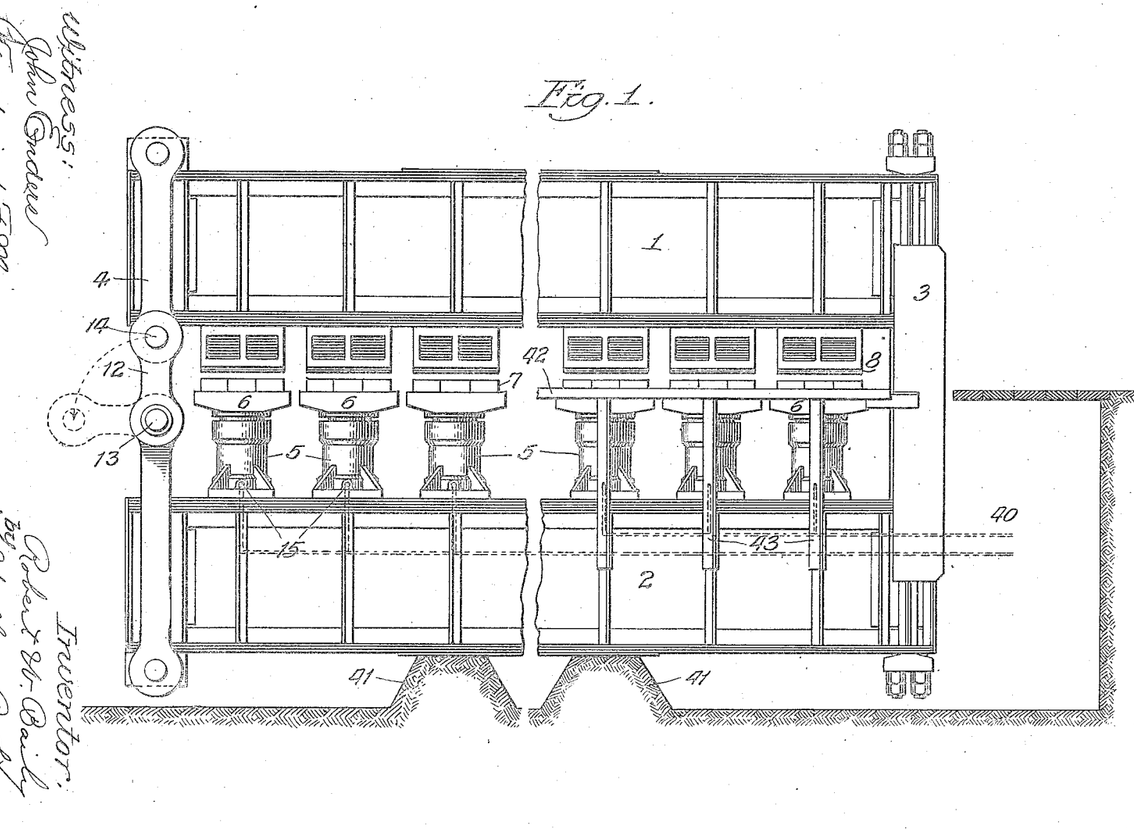
Fig. 1 is a side elevation partly broken away of a bending press constructed in accordance with the present invention.

My improved bending press, as will be seen by an inspection of the drawings, comprises the upper girder 1, the lower girder 2 and the end supports 3 and 4, which supports may assume any form desired to properly support and connect the upper and lower girders and furnish sufficient resistance or reaction during the bending operation. As shown in Fig. 1, the supporting members 4 are of special formation for a purpose to be hereinafter pointed out.

Mounted upon the upper surface of the lower girder 2 are hydraulic jacks 5, of which there may be any suitable number to accommodate bending of any length of plate desired. Upon the upper end of the moving portion of the hydraulic jack are secured the heads 6 (seen more clearly in Fig. 3), and upon which heads are in turn mounted the detachable lower dies 7, the upper surface of which lower dies are formed with the desired curvature, the upper die 8 being similarly curved, whereby the pair of dies will cooperate in a suitable manner to give the required curvature to the plate being operated upon. The upper dies 8 are detachably connected by means of bolts 9 to the upper heads 10, which heads are in turn suitably secured to the lower surface of the upper girder 1.

The heads 6 of the hydraulic jacks are positioned sufficiently close to each other that in operating upon a sheet the adjacent dies will be sufficiently close together to produce a continuous bend throughout the length of the sheet.

Figure 5:
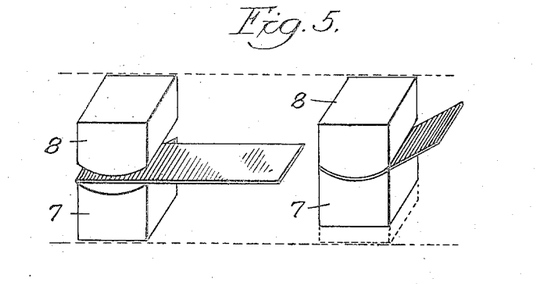
Figures 5, 6 and 7 are diagrammatic views illustrating the steps involved in bending a plate in substantially circular form according to the present invention.
Figure 6:
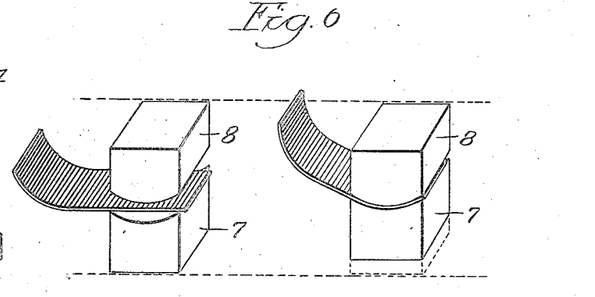
Figure 7:
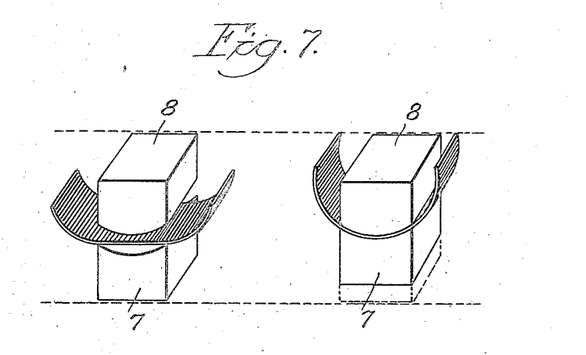

Referring to Figures 5, 6 and 7, it will be seen that the bending operation employed in this type of machine consists, first, in inserting between the separated dies one side of the plate, after which the dies are brought together and the plate (which may be either hot or cold as desired), bent into a curvature corresponding to that of the dies. This first step is illustrated in Fig. 5, the plate being shown of short length for the sake of clearness and illustration, it being understood that the length of the plate being bent will vary and in some instances it will extend the full length of the machine and be operated upon by all of the dies in such manner that the axis of curvature will be parallel to the length of the machine.

The dies are then separated by lowering the hydraulic jacks and the plate moved through the dies into the position shown on the left hand side of Fig. 6, after which the dies will be again brought together, as shown on the right hand of Fig. 6, thus forming in this portion of the plate a curvature corresponding to that of the dies.

The plate will then be placed between the dies in the manner indicated on the left hand side of Fig. 7, after which the dies will be again brought together to finish the bending of the entire plate in such manner as to give it the curvature illustrated on the right hand side of Fig. 7. In lieu however, of such operations the plate may, after the first bending operation, be moved into the press only a sufficient distance so that the bent portion of the plate will take the position shown in Fig. 7 and a series or succession of these operations will form the plate to the desired curvature.

The dies, as pointed out above, are removable whereby they may be replaced with other dies having different curvature, whereby to make possible the bending of the plates into any desired degree of curvature. In cases where the curvature of the finished sheet is such as to permit the plate will then be removed by withdrawing it sideways from between the dies.

Figure 4:
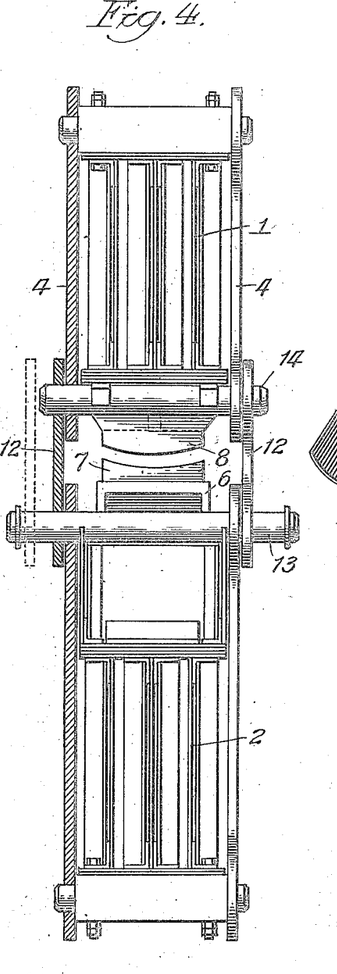
Fig. 4 is an end elevation looking towards the left hand side of Fig. 1 and showing the supporting links of the rear side of Fig. 1 in section.

Should however, the curvature of the finished plate be sufficiently near that of a complete circle whereby to render it difficult or impossible to remove the same sideways from between the dies, I then remove the cylindrical structure from between the dies by swinging the links 12 downwardly into the position shown in dotted lines on the left hand side of Fig. 1. The arrangement of these links is clearly shown in Fig. 4, from which it will be seen that they are pivotally mounted upon the pin 13, which pin is of greater length than the overall distance between the links, whereby to permit the links to be moved longitudinally along the pin in order to free the upper end of the links from the respective end of the pin 14, which pin as shown in Fig. 1 extends through a suitable aperture provided in the end of the link. When the links 12 are in the position illustrated in solid lines in Fig. 4, whereby to hold the supporting member in operative position they may be there retained by snugness of fit, the use of removable cotter keys, or in any other appropriate manner. To effect the removal of the cylindrically bent plate from between the dies the links 12 are moved outwardly along the pin 13 to occupy the position illustrated in dotted lines on the left hand side of Fig. 4, thus freeing both links 12 from the pin 14, after which they will be swung downwardly as shown in Fig. 1 to permit the finished cylinder to be removed from the press, after which the links 12 may be returned to operative position. The press, however, may be built with both ends solid instead of having one end arranged to open, if desired.

Figures 2, 3:
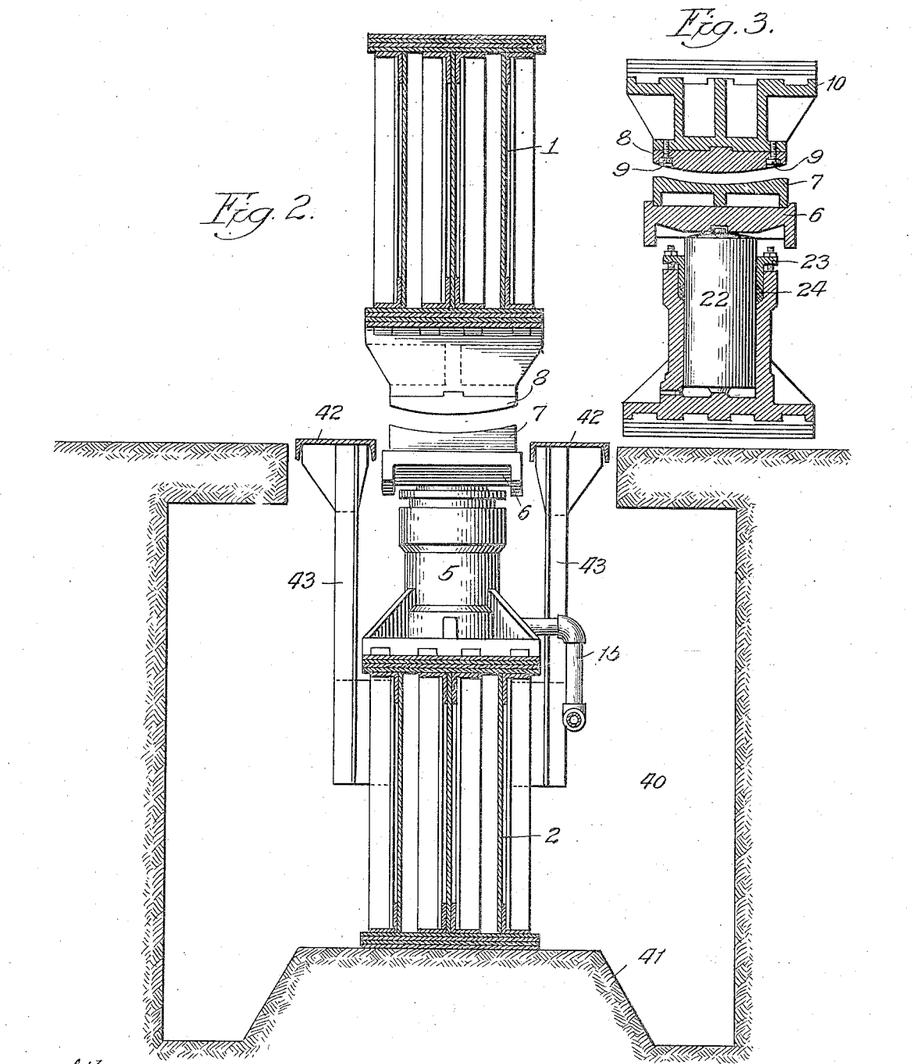
Fig. 2 is a transverse vertical section through Fig. 1.
Fig. 3 is a transverse vertical section through a pair of the dies and the accompanying hydraulic cylinder.

It will of course, be understood that the operation of the hydraulic jacks 5 will be controlled by means of suitable valves placed in the supply pipes 15, illustrated in Fig. 2 and the arrangement of these valves may be such that the hydraulic jacks may be operated either singly in groups or altogether. The arrangement of such valves to effect this result it is believed will be obvious from the present description and hence has not been illustrated.

Figure 10:
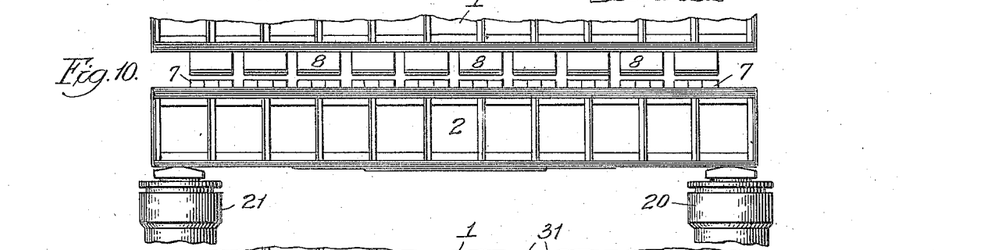
Fig. 10 is a modified form showing the application of a hydraulic jack under each end of the lower girder and with the lower dies secured directly to the upper surface of this girder.

Instead of using a plurality of hydraulic jacks positioned upon the upper surface of the lower girder, as shown in Fig. 1, a single jack of sufficient strength may be placed beneath each end of the lower girder and the lower dies be secured directly to the upper surface of this lower girder. This construction is illustrated in Fig. 10, from which it will be obvious that simultaneous operation of the jacks 20 and 21 at the ends of the girder will effect the simultaneous operation of all of the lower dies accordingly.

As will be seen in Fig. 3, the heads 6, upon which the lower dies 7 are carried, may be so mounted upon the upper end of the piston 22 of the hydraulic jack as to permit a slight rocking movement of the head 6 and die 7, whereby to readily adapt itself to any irregularities that might be present during the bending operation, and thus enable the dies to correctly seat themselves.

The hydraulic jack is provided with the usual gland 23 and packing 24, in order to form an effective seal.

Figure 8:
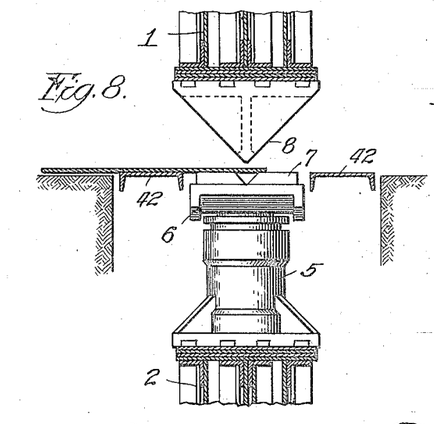
Figures 8 and 9 are sectional views showing a modified form of dies used in forming rectangular bends.
Figure 9:
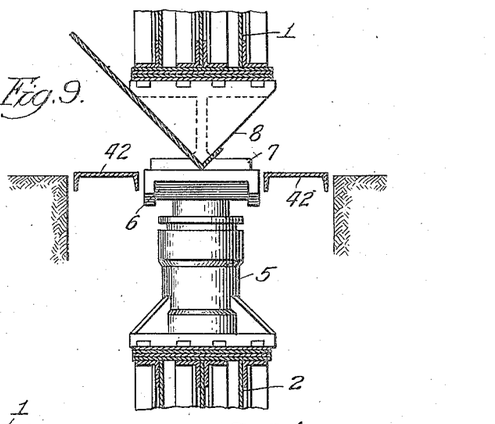

By removing the dies having curved surfaces and replacing them with other dies, rectangular bends may be formed as illustrated in Figures 8 and 9 near the edge of long plates for use as gusset plates, or as sides or bottoms of rectangular tanks. It is also obvious that any other suitable bends may be formed in this machine by inserting therein dies having the appropriate configuration. It will of course, be undestood that the hydraulic cylinders will be connected up with a suitable pump and accumulator in the manner usual in the operation of such jacks.

While I have shown herein the use of hydraulic jacks, it is, of course, obvious that should the same be desired these jacks could be replaced by large screws, hand operated, or wedges or other devices operated by hand or power to effect a suitable compression for bending the plates.

Figure 11:
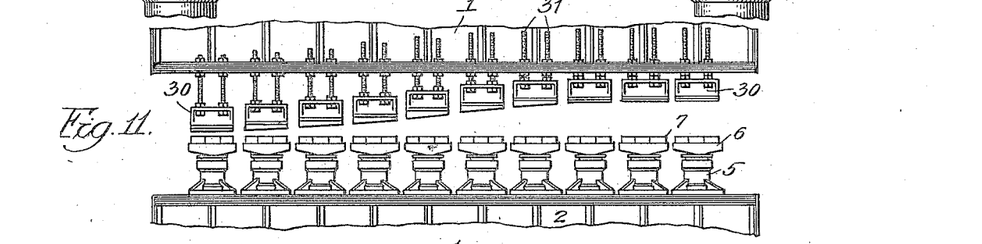
Figures 11 and 12 show a further modification in which a plurality of rows of hydraulic presses and corresponding pairs of dies are provided to effect the bending of a large plate into the form of a warped surface.
Figure 12:
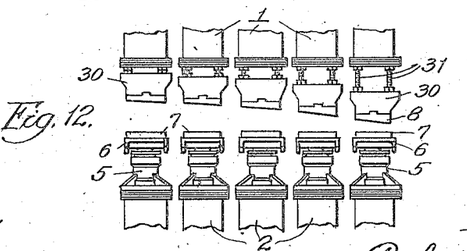

In ship work there is also a large amount of plate bending to be done especially near the bow and stern where the plates must be warped to take the double curvature of the frames; in other words, the plates must be bent to assume the form of warped surfaces. To do this character of work it is proposed to place a series of upper girders side by side to form an upper floor or support of sufficient width to cover the widest plate. Properly attached to this upper floor will be a series of vertically adjustable pads or stools 30 (see Figures 11 and 12) to which pads or stools will be in turn secured the upper dies 8, which dies will be formed with the proper curvature to give the desired bend to the plates. By adjusting the screws 31 in a suitable manner the upper dies 8 may be fixed in the desired position whereby after all of the dies have been adjusted their general curvature will be that of a warped surface, the compound curvature of which will be clearly seen in Figures 11 and 12, Figure 12 showing the width of the sets of dies and Fig. 11, the length thereof. An inspection of Figures 11 and 12 will clearly show that after the pads and upper dies have been adjusted to the proper position the contour of the die surfaces taken altogether will give the desired surface for the finished plate. On a similar lower floor will be placed parallel rows of hydraulic cylinders or screws carrying on their tops pads or stools coming directly below the pads or stools on the upper floor and having a curvature corresponding to that of the respective dies forming the upper surface. In operation the plates (hot or cold) will be inserted in the machine and when the pressure is applied to all of the lower cylinders they will rise and force the plate to conform to the contour or surface of the upper dies, thus giving the required curvature to the complete plate. The details of operation and construction of the form shown in Figures 11 and 12 will otherwise be similar to that described above in connection with the other forms.

As shown in Fig. 2 the lower portion of the apparatus may if desired be suitably positioned in a pit 40 upon foundations 41, whereby to bring the dies into appropriate position to facilitate the easy insertion of the plates therebetween. Platforms 42, mounted upon uprights 43 which are in turn secured to the lower girder 2, may be provided to further facilitate in handling the work. In the use of lower dies not having too great thickness the plate to be bent may be slid upon the platform 42 directly into position between the dies as illustrated in Fig. 8.

Figure 13:
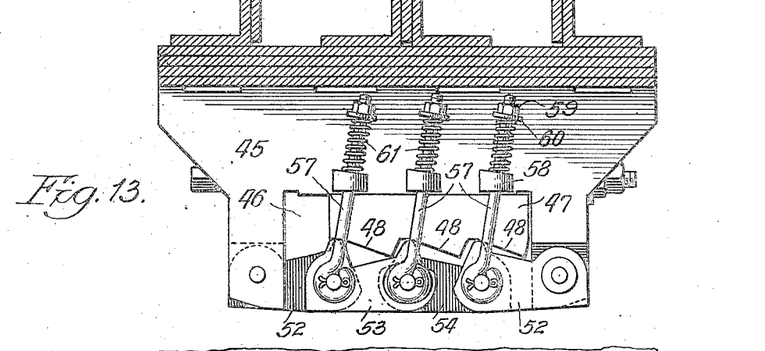
Figure 13 is a transverse vertical section through the lower portion of the upper girder showing in elevation a form of upper die member in which the degree of curvature may be adjusted as desired.
Figure 14:
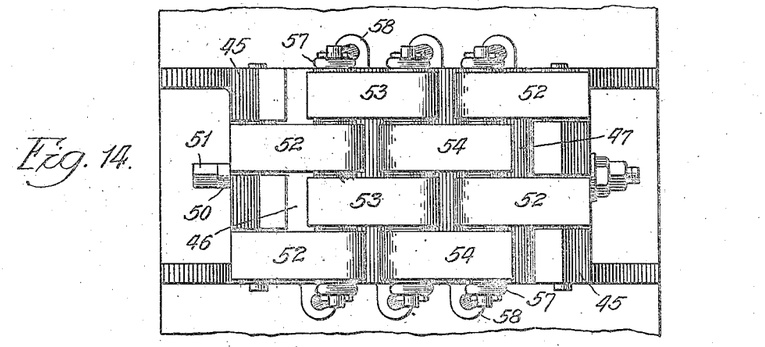
Figure 14 is a bottom plan view of Fig. 13.
Figure 15:
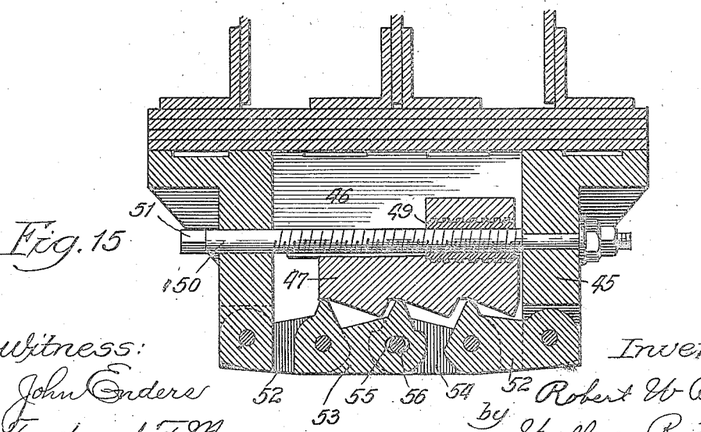
Fig. 15 is a vertical sectional view through the central plane of the upper die member of Fig. 13.

Referring now to Figures 13 to 15, it will be seen that if desired I may form the upper die member of such nature that the degree of curvature of its face may be adjusted as desired. This adjustable form of the upper die member comprises the body portion 45 having the chamber 46, within which is mounted for a longitudinal movement therein the wedge member 47, having a plurality of lower inclined faces 48. Suitably fixed in the wedge member 47 is the nut 49, having threaded engagements with the shaft 50, which shaft may be rotated by placing a wrench upon the head 51. Pivotally mounted within the body portion 45 at its lower edges are the outer links or segments 52, to which are in turn pivotally connected the intermediate links 53 and 54, the point of connection between the links 53 and 54 assuming the form of a pin 55 and slot 56, whereby to permit a downward movement of these parts. Secured to the outer ends of the pins forming the pivotal connection between the various links are the rods 57 which pass through lugs 58 and are provided at their ends with the nuts 59 and washers 60. Positioned between the washers 60 and lugs 58 are the spiral springs 61, which normally tend to hold the rods 57 in an elevated position. As is obvious rotation of the shaft 50 in the appropriate direction will move the sliding wedge 47 to the left (see Fig. 15) which will in turn depress the various links or segments by virtue of the engagement between the bevelled faces 48 and the upwardly projecting portions of the various links. From this it will be obvious that any desired curvature may be given to the face of this die member by merely rotating the shaft 50 a suitable amount in the appropriate direction.

Figure 16:
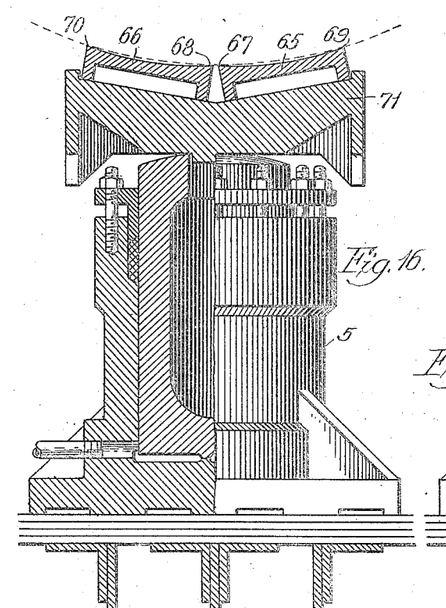
Fig. 16 is a view similar to Fig. 3, but showing a modified form of lower die member and support therefor.
Figure 17:
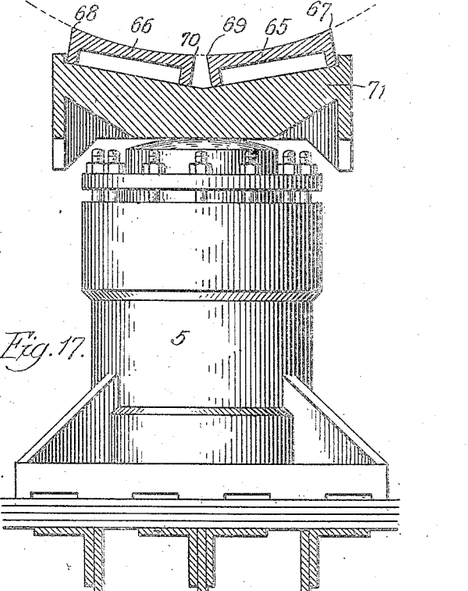
Fig. 17 is a view similar to Fig. 16, but showing the elements of the lower die member as occupying a different position whereby to give a curvature of smaller radius.

Referring now to Figures 16 and 17, it will be seen that the lower die member may be formed of two members 65 and 66, one edge 67 and 68 respectively of each of these members being higher than the other edges 69 and 70 respectively. The upper face of the support 71 is suitably beveled as shown to bring these die members into proper position. By reversing one or both of these die members 65 and 66 the degree of curvature to be imparted to the plate bent thereon may be varied within certain limits. For example, the position of these plates in Figure 16 with the high edges 67 and 68 adjacent each other and the low edges 69 and 70 being placed on the outside will give a curvature as indicated in dotted lines, while if the position of these plates be reversed, that is, the high edges turned to the outside, and the low edge to the inside as shown in Fig. 17, a curvature of smaller radius will be produced as indicated in dotted lines in Fig. 17. By reversing only one of these plates, so as to have the high edge of one inside and its low edge outside, while the other plate has the low edge inside and the high edge outside a curvature of still different radius will be effected.

It will thus be seen that by reversing these elements of the lower die edge for edge the average curvature of the lower dies will be increased or decreased as the case may be.

Figure 18:
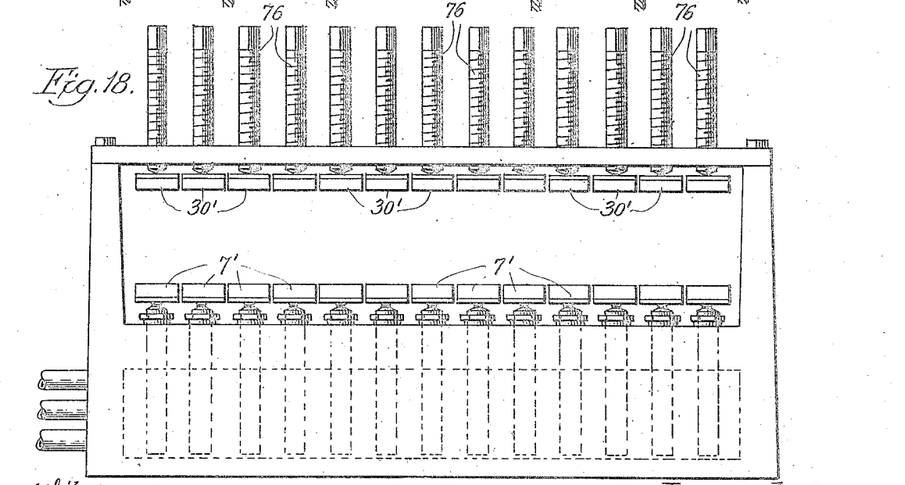
Fig. 18 is a side elevation of my press showing a modified arrangement of upper and lower die members for producing warped surfaces.
Figure 19:
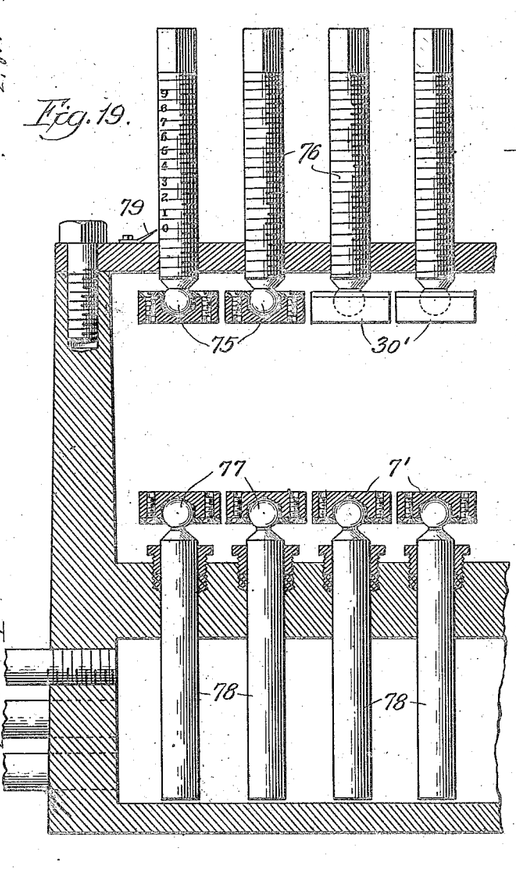
Fig. 19 is a fragmentary vertical longitudinal section at one end of the press shown in Fig. 18.
Figure 20:
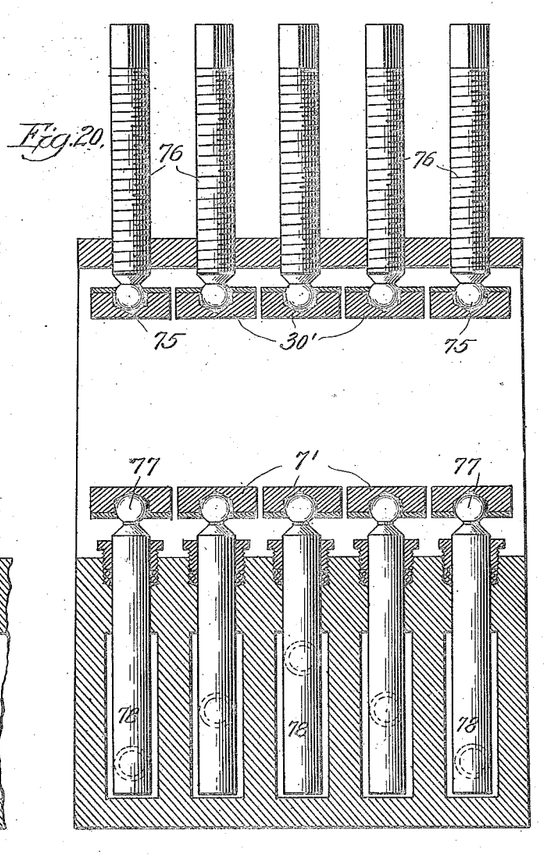
Fig. 20 is a vertical transverse section through Fig. 18, Figures 19 and 20 being drawn to a larger scale than Fig. 18.

Referring now to Figs. 18 to 20, it will be seen that the arrangement for bending warped surfaces may assume the form of upper and lower dies respectively mounted with ball and socket connections whereby these dies may readily assume any angular position necessary to accommodate the bending of any particular degree of curvature. As illustrated, the upper die members are mounted by the ball and socket connections 75 to the lower end of the vertically extending threaded shafts 76, provided at their upper ends with a formation for the reception of a wrench or the like. Any other suitable means may be used to secure the required vertical adjustment. The lower die members are mounted in a similar manner by means of the ball and socket connections 77 to the upper portion of the plungers 78 of the hydraulic jack. I may, if desired, substitute any other form of swivel connection for the ball and socket arrangement illustrated, the essential requirement being to allow the plane of the face of the pad to take any position having an angle with the horizontal. When the various screws carrying the upper pads 30' are brought down to various elevations, the lower face of the upper pads may take any desired general surface, flat or warped, and the lower pads 7' can be raised by means of the plungers whereby to carry the plate or material to be bent up against the surface of the upper pads 30', whereby to give the plate or material the desired curvature. While I have in this connection shown and described pads, I wish it to be understood that I may if desired use any other suitable means to produce the required curved surface, such for example, links or jointed surfaces as shown in Figs. 13–15, or other forms adapted to this purpose. The upper screws carrying the upper pads may be adjusted up or down, either by hand or by any suitable mechanical means desired. Their vertical adjustment may be effected by several means, among which may be mentioned the provision of a vertical index or scale on each screw as illustrated at 79 in Fig. 19, whereby to quickly gauge the amount of vertical adjustment given to the screw. Also if desired the screws may all be made of the same length with rounded tops and the amount of their vertical adjustment ascertained by letting a templet or pattern having desired finished curvature lay across the tops of these screws. The screws will then be adjusted so that their top ends all come in contact with the templet or pattern which will bring the faces of the upper dies into position to give the desired curvature, warped or otherwise.

Having now described my invention, I claim:

1. In a bending press a plurality of pairs of dies, one die of each pair universally rockably mounted and being movable toward and away from its corresponding die whereby to effect the bending of plates of great length without the use of rolls.

2. In a bending press a plurality of pairs of dies, one die of each pair mounted rockably in any direction to permit the die to automatically seat itself and being movable toward and away from its corresponding die whereby to effect the bending of plates of great length without the use of rolls, and means for causing said movable dies to approach and recede from the other dies.

3. In apparatus for bending long metal plates without the use of rolls, a plurality of pairs of dies the respective dies of which are mounted on suitable supports, said dies being arranged in a plurality of rows, one die of each pair being universally rockably mounted and adjustable toward or away from the other die of said pair whereby the contour of the faces of said adjustable dies may be made to assume the curvature of a warped surface, and means for causing the other dies to approach said adjustable dies whereby to press therebetween a plate into the form of a warped surface.

4. In a press for bending long metal plates without the use of rolls, a plurality of rows of jacks, a head mounted on each of said jacks and capable of rocking movement thereon to automatically seat itself according to the contour of the plate, a detachable die on each of said heads, a plurality of rows of stationary detachable dies registering respectively with said first mentioned dies, said jacks being independently operable to cause the movable dies to approach the stationary dies.

5. The method of bending metal plates into the form of a warped surface which consists in providing a plurality of rows of adjustable stationary dies, a plurality of rows of movable pressing dies, in adjusting said stationary dies so that their faces will lie in substantially the curvature of a warped surface, in placing a plate between said dies, and then advancing the movable dies singly, in groups or all together toward the stationary dies to bend said plate into said warped-surface curvature.

6. In a bending press a plurality of upper dies, a plurality of lower dies, some of said dies being provided with a plurality of stamping faces whereby they may be adjusted to give curvatures of different radii.

7. In a bending press an adjustable die member comprising a plurality of pivotally connected links forming th face of the die, and means for adjusting said links to give curvatures of different radii, said links having a cam surface, a driving wedge to co-act with said cam surface and a shaft having threaded engagement with said wedge to move the wedge to change the face of the die.

8. In a bending press a rockably mounted adjustable die member comprising two parts arranged side by side and each formed with greater thickness at one side than the other whereby one or both of said parts may be reversed to give an average curvature of different radius.

9. In a bending press a plurality of rows of upper die members, said upper die members having a surface of joined parts, a plurality of rows of lower die members, a support for each of said die members, said die members being swivelly and adjustably connected to their respective supports, means for adjusting the upper die members to various vertical positions whereby the contour of their combined faces may assume the curvature of a warped surface, and means for forcing said lower dies towards said upper dies.

In witness whereof, I hereunto subscribe my name to this specification.

ROBERT W. BAILY.